United States Patent
Bomya et al.

(10) Patent No.: US 6,552,662 B1
(45) Date of Patent: Apr. 22, 2003

(54) MAGNETIC SENSOR

(75) Inventors: Timothy J. Bomya, Westland; Alan J. Riggs, Ann Arbor, both of MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 0 days.

(21) Appl. No.: 09/648,528

(22) Filed: Aug. 26, 2000

Related U.S. Application Data
(60) Provisional application No. 60/150,866, filed on Aug. 26, 1999.

(51) Int. Cl.$^7$ ............................................. G08B 13/14
(52) U.S. Cl. ............................... 340/572.1; 340/572.5; 340/572.6; 340/573.1; 340/554; 340/551; 340/438
(58) Field of Search .................... 340/572.1, 572.5, 340/572.6, 573.1, 554, 551, 438; 280/735

(56) References Cited

U.S. PATENT DOCUMENTS

| | | | |
|---|---|---|---|
| 1,813,746 A | 7/1931 | Kinsley | 324/243 |
| 3,659,197 A | 4/1972 | Alley et al. | 324/51 |
| 3,740,567 A * | 6/1973 | Atkins | 307/10 SB |
| 3,863,209 A * | 1/1975 | Hollins | 340/426 |
| 3,898,472 A | 8/1975 | Long | 307/10 SB |
| 3,943,376 A | 3/1976 | Long | 307/116 |
| 4,300,116 A | 11/1981 | Stohovec | 340/32 |
| 4,430,645 A | 2/1984 | Eskandry et al. | 340/572 |
| 5,134,371 A | 7/1992 | Watanabe et al. | 324/252 |
| 5,177,445 A | 1/1993 | Cross | 324/637 |
| 5,404,128 A | 4/1995 | Ogino et al. | 340/425.5 |
| 5,413,378 A | 5/1995 | Steffens, Jr. et al. | 280/735 |
| 5,439,249 A | 8/1995 | Steffens, Jr. et al. | 280/735 |
| 5,446,391 A | 8/1995 | Aoki et al. | 324/661 |
| 5,525,843 A * | 6/1996 | Howing | 280/727 |
| 5,570,903 A | 11/1996 | Meister et al. | 280/735 |
| 5,580,084 A | 12/1996 | Gioutsos | 280/735 |
| 5,626,359 A | 5/1997 | Steffens, Jr. et al. | 280/735 |
| 5,646,613 A | 7/1997 | Cho | 340/903 |
| 5,683,103 A * | 11/1997 | Blackburn et al. | 340/457.1 |
| 5,707,076 A | 1/1998 | Takahashi | 280/735 |
| 5,739,757 A | 4/1998 | Gioutsos | 340/667 |
| 5,747,696 A | 5/1998 | Kwun et al. | 73/728 |
| 5,785,347 A * | 7/1998 | Adolph et al. | 280/735 |
| 5,790,031 A * | 8/1998 | Shelton et al. | 340/572 |
| 5,838,233 A | 11/1998 | Hawes et al. | 340/572 |
| 5,914,610 A | 6/1999 | Gershenfeld et al. | 324/663 |
| 5,948,031 A | 9/1999 | Jinno et al. | 701/45 |
| 6,039,345 A | 3/2000 | Cech et al. | 280/735 |
| 6,043,736 A | 3/2000 | Sawahata et al. | 340/438 |
| 6,043,743 A | 3/2000 | Saito et al. | 340/562 |
| 6,094,610 A | 7/2000 | Steffens, Jr. et al. | 701/45 |
| 6,104,293 A | 8/2000 | Rossi | 340/573.1 |

FOREIGN PATENT DOCUMENTS

| | | | |
|---|---|---|---|
| EP | 0 453 824 A1 | 10/1991 | G01B/7/14 |
| JP | 56-457802 | 5/1981 | G01B/7/28 |

OTHER PUBLICATIONS

Kwun, H., "Magnetostrictive Sensors Technology", reprinted from Technology Today, Mar., 1995, pp. 3–7.

Uras, M., "Signal Detection Methods for Magnetostrictive Sensors", 970604, reprinted from *Sensors and Actuators* 1997, SP–1220, Society of Automotive Engineers, Feb. 24, 1997, pp. 23–33.

* cited by examiner

*Primary Examiner*—Jeffery Hofsass
*Assistant Examiner*—Daniel Previl
(74) *Attorney, Agent, or Firm*—Dinnin & Dunn, P.C.

(57) ABSTRACT

A magnetic sensor comprises at least one first coil operatively coupled to a first portion of a vehicle seat and at least one magnetic sensing element operatively coupled to an interior portion. At least one first signal is operatively connected to the at least one first coil, wherein the at least one first signal is an oscillating signal. At least one second signal responsive to the at least one first signal is sensed from the at least one magnetic sensing element, and an occupant is discriminated an occupant on the vehicle seat responsive to the second signal.

30 Claims, 3 Drawing Sheets

MAGNETIC SENSOR

The instant application claims the benefit of prior U.S. Provisional Application Serial No. 60/150,866 filed on Aug. 26, 1999, which is incorporated herein by reference.

Figure 1:
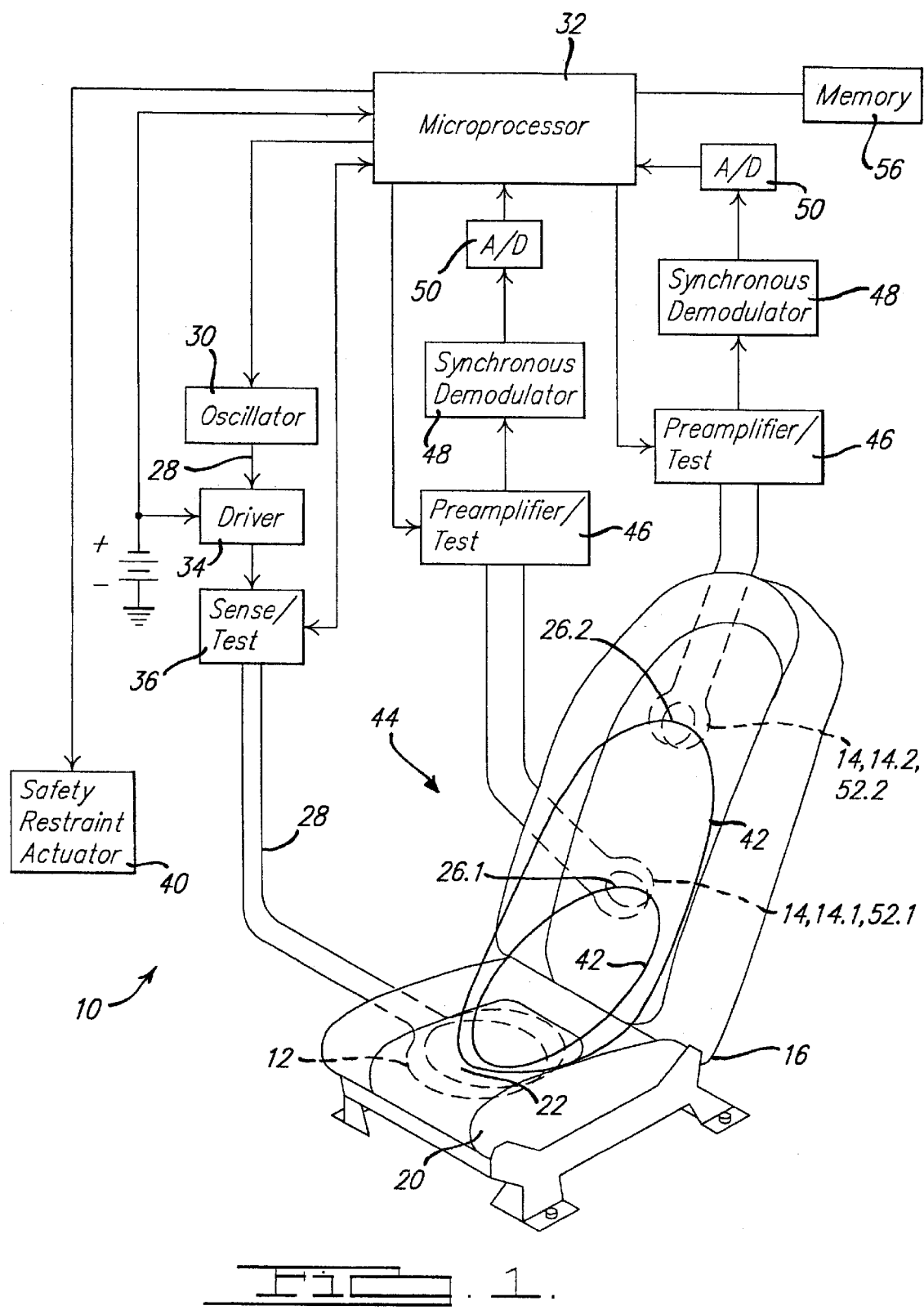
FIG. 1 illustrates a first embodiment of a magnetic sensor.
Figure 2:
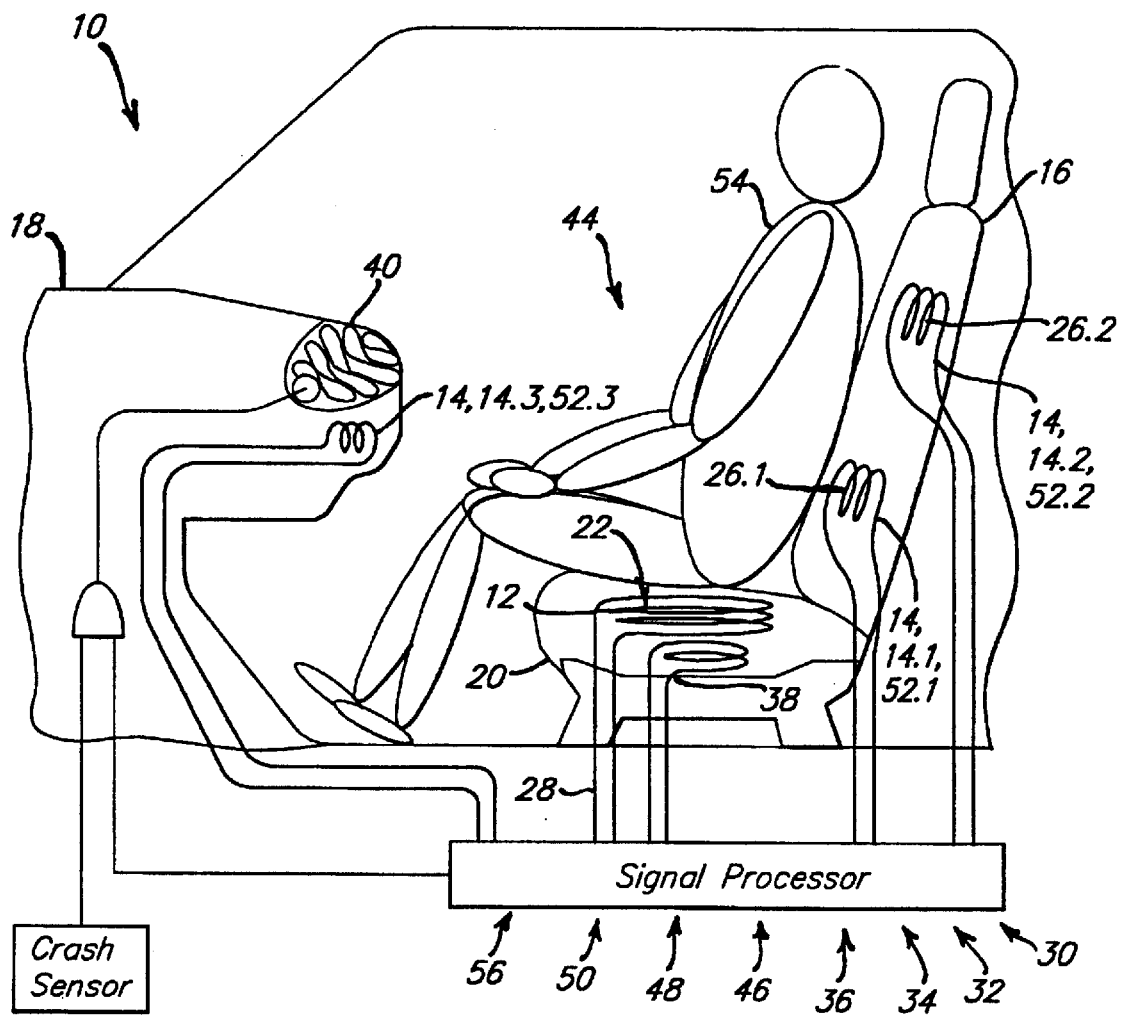
FIG. 2 illustrates a second embodiment of a magnetic sensor.

Referring to FIGS. 1 and 2, a magnetic sensor 10 comprises at least one first coil 12 and at least one magnetic sensing element 14 incorporated in a seat 16 of a vehicle 18. For example, a first coil 12 is mounted in the seat base 20 at a first location 22, and at least one magnetic sensing element 14 is operatively coupled to an interior portion of the vehicle, for example, a plurality of magnetic sensing elements 14.1, 14.2 are mounted in the seat back 24 at respective second locations 26.1, 26.2.

The at least one first coil 12 is operatively connected to a corresponding at least one first signal 28 comprising a sinusoidal voltage generated by an oscillator 30. For example, the oscillator 30 may comprise a crystal stabilized (i.e. Substantially drift-free) TTL square wave signal generated by a microprocessor 32 and subsequently filtered by a band-pass filter. The oscillation frequency of the oscillator 30 is selected, as a function of the expected noise sources, to enhance system performance. For example, a frequency different from that of AC power lines (e.g. 60 Hz), such as an ultrasonic frequency, might be chosen to avoid interference therefrom. The oscillator 30 may be modulated in amplitude, frequency, or by bursting. The signal from the oscillator 30 is fed to a coil driver 34, for example, through a buffer amplifier.

Each at least one first coil 12 is driven by an associated coil driver 34 that provides sufficient power at an impedance compatible with the first coil 12 so that the resulting magnetic field is sufficiently strong to be detected by the at least one magnetic sensing element 14. The coil driver 34 is also, for example, provided with short circuit protection and is operated so as to avoid saturation or clipping of the first signal 28. The coil driver 34 is designed to operate in an automotive environment, for example to operate over an associated range of possible battery voltages. The first signal 28 from the coil driver 34 may, for example, be either a voltage signal or a current signal.

The coil driver 34 drives the first coil 12 through a sense/test circuit 36. The sense/test circuit 36 senses either a current or voltage from the first coil 12, or a signal from a supplemental sense coil 38, or a combination of the three, to confirm or test the operation of the first coil 12. For example, a supplemental sense coil 38 would directly sense the magnetic flux generated by the first coil 12. The sense/test circuit 36 may also, for example, test the first coil 12 for an open or short so as to improve the reliability of the magnetic sensor 10, particularly when used to control the actuation of a safety restraint actuator 40, so as to prevent a false deployment or a failure to deploy when necessary. The integrity, or health, of the at least one first coil 12 is, for example, tested every measurement cycle. The sense/test circuit 36 can also provide a measure of the power delivered to the first coil 12, which can provide an indication of the presence and type of object on the seat 16.

The at least one first coil 12 may, for example, be series resonated to increase the current flow therein, thereby increasing the amount of magnetic flux 42 generated by the at least one first coil 12. The magnetic flux 42 from the at least one first coil 12 extends into the region of space proximate to the at least one first coil 12, including the region of occupancy above the seat 16, and is attracted to materials of relatively high permeance therein, for example steel components such as the seat frame or seat springs. The at least one first coil 12 is part of a magnetic circuit 44 that extends through the region of seat occupancy to the at least one magnetic sensing element 14. Increased magnetic flux in the magnetic circuit 44 provides for a higher signal-to-noise ratio in the signal or signals received or detected by the magnetic sensor 10. The at least one first coil 12 may be compensated for variations in temperature by incorporating an associated temperature sensor.

The at least one magnetic sensing element 14 is responsive to the magnetic flux 42 at the at least one second location 26. An output from the at least one magnetic sensing element 14 is operatively connected to a preamplifier/test circuit 46 which, for example, buffers the magnetic sensing element 14 from loading by the subsequent circuitry and provides a relatively low impedance output so as to reduce noise. The preamplifier/test circuit 46 also amplifies the signal from the at least one magnetic sensing element 14 to a level sufficiently high to permit appropriate signal processing and demodulation before subsequent analog-to-digital conversion for processing by the microprocessor 32. The microprocessor 32 gathers data, monitors system health and integrity, and determines whether or not to actuate the safety restraint actuator 40.

The preamplifier/test circuit 46 also monitors the integrity of the magnetic sensing element 14, for example by comparing the signal therefrom with "expected" levels and expected wave shapes (e.g. a sinusoidal shape), providing a continuous test of the integrity of the magnetic sensing element 14. The preamplifier/test circuit 46 may also, for example, test the at least one magnetic sensing element 14, for example a second coil 52, for an open or short so as to improve the reliability of the magnetic sensor 10, particularly when used to control the actuation of a safety restraint actuator 40, so as to prevent a false deployment or a failure to deploy when necessary. The integrity, or health, of the at least one magnetic sensing element 14 is, for example, tested every measurement cycle.

The magnetic sensing element 14 senses from the magnetic flux 42 a sinusoidal carrier that is modulated responsive to the reluctance of the magnetic circuit 44. This signal from the magnetic sensing element 14 is amplified by the preamplifier/test circuit 46, and a synchronous demodulator 48 operatively connected thereto extracts the modulation signal from the sinusoidal carrier, which modulation signal is then DC coupled through an A/D converter 50 to the microprocessor 32.

The above described magnetic sensor 10 can be embodied in various ways. The particular circuitry, whether analog, digital or optical is not considered to be limiting and can be designed by one of ordinary skill in the art in accordance with the teachings herein. For example, where used, an oscillator, amplifier, logic element, modulator, demodulator, A/D converter can be of any known type, for example using transistors, for example field effect or bipolar, or other discrete components; integrated circuits; operational amplifiers, or logic circuits, or custom integrated circuits. Moreover, where used, a microprocessor can be any computing device.

Responsive to the at least one first signal 28, the at least one first coil 12 generates a magnetomotive force in the magnetic circuit 44 so as to generate a magnetic flux 42 therein. The at least one magnetic sensing element 14 at the at least one second location 26 senses the magnetic flux 42 thereat, which is responsive to the magnetomotive force from the at least one first coil 12, and to the magnetic properties of the magnetic circuit 44.

For example, as illustrated in FIG. 1, in a first embodiment, one first coil 12 is located in the seat base 20; and the at least one magnetic sensing element 14 comprises a plurality of second coils 52.1 and 52.2 in the seat back 24. In operation, the at least one first signal 28 operatively coupled to the associated at least one first coil 12 by the associated at least one coil driver 34 causes a current flow in the at least one first coil 12 which generates a magnetic flux in the magnetic circuit 44. A magnetic circuit 44 is characterized by a reluctance R, wherein the amount of flux $\phi$ in a magnetic circuit for a given magnetomotive force F is given by $\phi=F/R$. The reluctance R of a series magnetic circuit is given by the sum of the respective reluctances of the respective elements in series. The reluctance of air is significantly greater than that of a ferromagnetic material, and a ferromagnetic material entering the magnetic circuit 44 affects the reluctance R of the magnetic circuit 44, which in turn affects the amount of flux to which the magnetic sensing element 14 is exposed, and which is sensed thereby. An occupant 54 on the seat 16 can be sensed by the magnetic sensor 10 from the permeance of iron containing blood, which is sufficient to influence the magnetic flux 42 in the magnetic circuit 44 enough to be detectable by the magnetic sensing element 14.

The first coil 12 has a self-inductance having one value when the first coil 12 is in free space, and another when the coil is part of the magnetic circuit 44. In the latter case, the self inductance of the first coil 12 is dependent upon the magnetic properties of the magnetic circuit 44. Moreover, the magnetic properties of the magnetic circuit 44 are altered if ferromagnetic elements are brought in proximity with the magnetic circuit 44. Accordingly, an occupant 54 on the seat 16 can influence the self-inductance of the first coil 12, and can change the magnetic coupling between a first coil 12 at a first location 22 and the magnetic sensing element 14 at a second location 26.

The at least one first signal 28 from the oscillator 30 is amplified by the associated at least one coil driver 34 and operatively coupled to the at least one first coil 12 through an associated sense/test circuit 36. The at least one first coil 12 generates a magnetic flux 42 in the magnetic circuit 44, and at least a portion of the magnetic flux 42 is sensed by the magnetic sensing element 14, for example, a plurality of second coils 52.1 and 52.2 in the seat back 24.

The ferromagnetic elements of the car seat 16, including the seat frame, can act as a magnetic lens to concentrate or focus the magnetic flux 42 within a region to be sensed. The magnetic flux 42 generally follows a path of least reluctance, which typically would correspond to sections of greatest amounts of magnetically permeable material. Accordingly, the magnetic circuit 44 may be augmented with ferrite or mu-metal elements, or permanent magnets, to further adjust the shape and extent of the magnetic flux field.

Both the power applied to the at least one first coil 12, and the gain and/or phase of the signal from the at least one magnetic sensing element 14 in relation to the at least one first signal 28, may be continuously monitored and stored in a memory 56 of a microprocessor 32 as a real-time magnetic signature of the seat occupancy condition. The real-time magnetic signature is compared with at least one other comparable magnetic signature—for example a magnetic signature representing an empty seat or various magnetic signatures representing various normally seated occupants 54 and out-of-position occupants 54—in order to determine if an associated safety restraint actuator 40 should be disabled to prevent the injury of an out-of-position occupant 54 located sufficiently close to the safety restraint actuator 40 to be susceptible to injury by the deployment thereof. The at least one normal signature may include magnetic signatures that account for variations in the magnetic flux 42 as a result of variations in seating position or variations in temperature. The normal signature may be updated over time so as to track minor perturbations of the seat 16 or of the interior of the vehicle 18.

The separate signals from the separate second coils 52.1 and 52.2 add a measurement degree of freedom for each separate coil. For example, for one of the second coils 52.1 below the other of the second coils 52.2, the separate signals provide measures of both the fore-aft position of the occupant 54 and the degree of forward lean of the occupant 54.

The magnetic sensor 10 provides a real-time validation of the health and integrity of the respective at least one first coil 12 and the at the second coils 52.1 and 52.2, by testing the respective coils for shorts or open conditions, or by using a separate sense coil 38 to detect the magnetic flux generated by the at least one first coil 12.

Referring to FIG. 2, in a second embodiment of the magnetic sensor 10, the at least one magnetic sensing element 14 comprises a plurality of three magnetic sensing elements 14.1, 14.2 and 14.3—illustrated as associated second coils 52.1, 52.2 and 52.3—at distinct second locations 26.1, 26.2 and 26.3, the first two being located as described hereinabove, and the third magnetic sensing element 14.3 located proximate to the safety restraint actuator 40 so as to provide a separate measure of the proximity of the occupant 54 to the safety restraint actuator 40. The associated signal generation and processing elements are similar to those illustrated in FIG. 1, and are represented by the signal processor 58 in FIG. 3, wherein the third magnetic sensing element 14.3 located proximate to the safety restraint actuator 40 is driven by a coil driver 34 through an associated sense/test circuit 36 with a signal from an oscillator 30.

Figure 3:
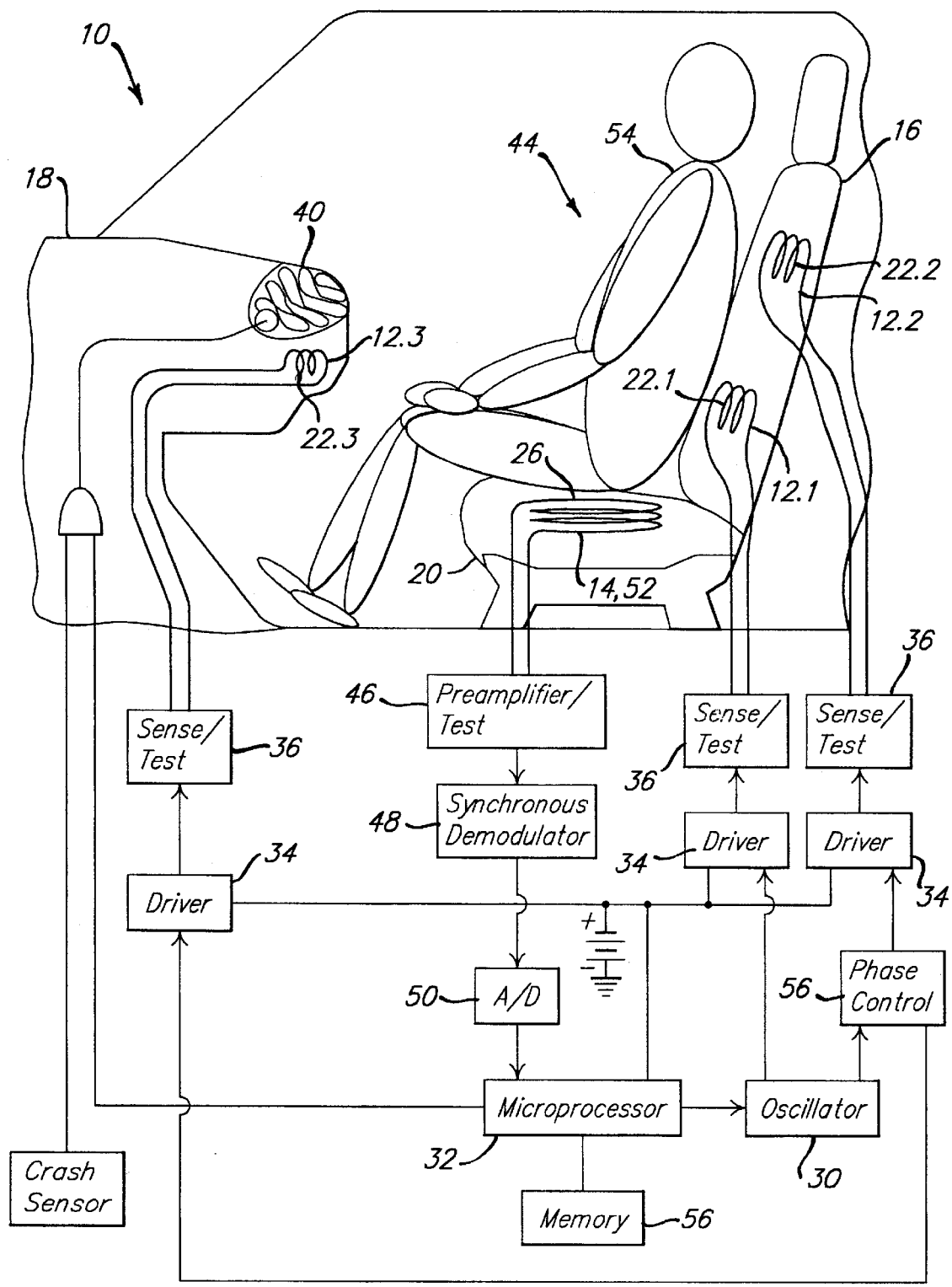
FIG. 3 illustrates a third embodiment of a magnetic sensor.

Referring to FIG. 3, in a third embodiment of the magnetic sensor 10, the at least one first coil 12 comprises a plurality of first coils 12.1, 12.2 and 12.3 at respective first locations 22.1, 22.2 and 22.3 and further comprises a magnetic sensing element 14, for example a second coil 52 at a second location 26 that is distinct from the first locations 22.1, 22.2 and 22.3. For example, of the first coils 12.1, 12.2 and 12.3, the first two are located in the lower and upper seat back 24 respectively, and the last is located proximate to the safety restraint actuator. The second coil 52 is located in the seat base 20. The separate first coils 42.1 and 42.2 are driven by separate corresponding first signals 28.1, 28.2 and 28.3, each having either a distinct frequency or a distinct phase with respect to the other, so as to create a magnetic flux 42 from which the relative distribution of the different frequencies or phases in the signal sensed by the magnetic sensing element 14 can be distinguished. For example, the relative phase of the separate first signals 28.1, 28.2 and 28.3 is controlled by a phase control circuit 56 between the oscillator 30 and two of the coil drivers 58, and which, for example, is under control of the microprocessor 56. The phase encoding of the respective first signals 28.1, 28.2 and 28.3 is similar in theory to the phase coding of color television and FM radio signals so as to increase the transfer of information along a channel with limited bandwidth. By separately encoding the separate first signals 28.1, 28.2 and 28.3, these respective signals from the first coils 12.1, 12.2 and 12.3 can be distinguished in the signal from the magnetic sensing element 14 so as to provide a measure of the position of the occupant 54 both relative to the seat 16 and relative to the safety restraint actuator 40. Alternately, the plurality of first coils 12.1, 12.2 and 12.3 may be connected in series or parallel and driven by a common coil driver 34, or they may be driven from separate oscillators 30 operating at two or more distinct frequencies.

The coils or sensing elements may incorporate a ferrite or other high permeability magnetic core. Also, highly-tuned coils can be used for magnetic signal generation. Moreover, the width and length of coil bobbins can be adapted to steer the magnetic flux 12.

The signals associated with the magnetic sensor 10 can be generated, adapted or processed in a variety of ways, including but not limited to:

1. AM, FM or pulsed demodulation of the magnetic signature;
2. Multi-tone, multi-phase electronics;
3. A magnetically-biased, phase-shift oscillator for low-cost pure sine wave generation;
4. A coherent synthetic or phased-locked carrier hardware- or microprocessor-based system;
5. A system of microprocessor gain-or offset-tuning through D/A then A/D self-adjust or self-test algorithm;
6. Placing a "standard" in the system safing field for magnetic calibration;
7. Inaudible frequencies;
8. Microprocessor-generated crystal stabilized frequencies for stability, including microprocessor D/A converter for coherent sine-wave generation;
9. Wide-band system electronics;
10. Closed loop gain- and phase-control of the signal to a sending-coil (i.e. AGC with the magnetic circuit acting as a delay line), wherein the gain- and phase-control signals are used as sensor outputs;
11. Monitoring the power delivered by the coil driver, particularly the bypass power, in order to detect impacts near or at the hinge(s) magnetically energized with the at least one first coil;
12. A series-resonant coil driver 34 circuit to increase current to flow to the at least one first coil 12 so as to improve the signal-to-noise ratio, wherein the associated current to the at least one first coil 12 is monitored to provide a continuous self-test of the at least one first coil 12, as well as a measure of the power drawn by the at least one first coil 12; and
13. Using another type of magnetic sensing element 14, for example a Hall effect device, instead of a second coil 52.

The magnetic sensor 10 may be further adapted to detect an occupant 54 on the seat 16, from the Doppler shift of the frequency of the magnetic flux responsive to the pulsating blood flow of the occupant 54, so as to distinguish between animate an inanimate objects on the seat. Infants are known to have a relatively fast heart rate which could be expected to provide a larger Doppler shift.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A magnetic sensor, comprising:
    a. at least one first coil operatively coupled to a first portion of a vehicle seat;
    b. at least one magnetic sensing element operatively coupled to an interior portion of said vehicle;
    c. at least one first signal operatively connected to said at least one first coil, wherein said at least one first signal is an oscillating signal;
    d. a means for sensing at least one second signal from said at least one magnetic sensing element, wherein said at least one second signal is responsive to said at least one first signal; and
    e. a means for discriminating an occupant on said vehicle seat, wherein said means for discriminating is responsive to said second signal, and said second signal is responsive to an interaction of an occupant on said vehicle seat with a magnetic field generated by said at least one first coil responsive to said at least one first signal, when said occupant is seated on said vehicle seat.

2. A magnetic sensor as recited in claim 1, wherein said interior portion comprises a second portion of said vehicle seat.

3. A magnetic sensor as recited in claim 2, wherein said second portion of said vehicle seat comprises a seat back.

4. A magnetic sensor as recited in claim 2, wherein said second portion of said vehicle seat comprises a seat bottom.

5. A magnetic sensor as recited in claim 1, wherein said means for discriminating is responsive to a Doppler shift of said oscillatory signal.

6. A magnetic sensor as recited in claim 1, wherein said first portion of said vehicle seat comprises a seat bottom.

7. A magnetic sensor as recited in claim 6, wherein said at least one first coil comprises a coil around a substantial portion of said seat bottom.

8. A magnetic sensor as recited in claim 5, wherein said at least one first coil comprises a coil around a substantial portion of said seat bottom.

9. A magnetic sensor as recited in claim 1, wherein said at least one magnetic sensing element is selected from at least one coil and at least one Hall effect sensor.

10. A magnetic sensor as recited in claim 1, wherein said at least one magnetic sensing element comprises a plurality of magnetic sensing elements.

11. A magnetic sensor as recited in claim 10, wherein at least one of said plurality of magnetic sensing elements is proximate to a lower portion of a seat back of said vehicle seat, and at least another of said plurality of magnetic sensing elements is proximate to an upper portion of said seat back.

12. A magnetic sensor as recited in claim 11, wherein at least another of said plurality of magnetic sensing elements is proximate to a safety restraint actuator.

13. A magnetic sensor as recited in claim 10, wherein at least one of said plurality of magnetic sensing elements is proximate to a second portion of said vehicle seat, and at least another of said plurality of magnetic sensing elements is proximate to a safety restraint actuator.

14. A magnetic sensor as recited in claim 1, wherein said interior portion comprises a portion that is proximate to a safety restraint actuator.

15. A magnetic sensor as recited in claim 1, wherein said at least one first coil comprises a plurality of first coils.

16. A magnetic sensor as recited in claim 15, wherein said at least one first signal comprises a plurality of first signals, and at least one of said plurality of first signals is operatively connect to at least one first coil of said plurality of first coils and is phase encoded so as to be distinguished from at least another first signal applied to at least another of said plurality of first coils.

17. A magnetic sensor as recited in claim 15, wherein at least one of said plurality of first coils is proximate to a second portion of said vehicle seat, and at least another of said plurality of first coils is proximate to a safety restraint actuator.

18. A magnetic sensor as recited in claim 15, wherein at least one of said plurality of first coils is proximate to a lower portion of a seat back of said vehicle seat, and at least another of said plurality of first coils is proximate to an upper portion of said seat back.

19. A magnetic sensor as recited in claim 18, wherein at least another of said plurality of first coils is proximate to a safety restraint actuator.

20. A magnetic sensor as recited in claim 1, further comprising a safety restraint actuator operatively connected to said means for discriminating an occupant on said vehicle seat, wherein an actuation of said safety restraint actuator is at least partially controlled by said means for discriminating an occupant on said vehicle seat.

21. A method of sensing an occupant in a vehicle seat of a vehicle, comprising:
   a. generating a magnetic flux at at least one first location in an interior of the vehicle so that said magnetic flux extends into a region of space bounded by a seat bottom and a seat back of the vehicle seat, wherein said region of space is at least partially occupied by an occupant on the vehicle seat when said occupant is seated on said vehicle seat;
   b. conducting said magnetic flux to at least one second location in said interior of the vehicle;
   c. sensing said magnetic flux at said at least one second location;
   d. generating at least one signal responsive to said magnetic flux sensed at said at least one second location, wherein said at least one signal is responsive to an interaction of an occupant on said vehicle seat with said magnetic field, when said occupant is seated on said vehicle seat; and
   e. discriminating an occupant when said occupant is seated on said vehicle seat wherein said operation of discriminating is responsive to said at least one signal.

22. A method of sensing an occupant in a vehicle seat of a vehicle as recited in claim 21, wherein at least one said at least one first location is within a first portion of said vehicle seat.

23. A method of sensing an occupant in a vehicle seat of a vehicle as recited in claim 22, wherein at least one said at least one second location is within a second portion of said vehicle seat.

24. A method of sensing an occupant in a vehicle seat of a vehicle as recited in claim 21, wherein at least one of said at least one first location and said at least one second location is proximate to a safety restraint actuator.

25. A method of sensing an occupant in a vehicle seat of a vehicle as recited in claim 21, wherein said at least one first location comprises a plurality of first locations.

26. A method of sensing an occupant in a vehicle seat of a vehicle as recited in claim 25, wherein at least one of said plurality of first locations is proximate to an upper portion of a seat back of said vehicle seat and at least another of said plurality of first locations is proximate to a lower portion of said seat back of said vehicle seat.

27. A method of sensing an occupant in a vehicle seat of a vehicle as recited in claim 25, further comprising modulating at least one phase of said magnetic flux, wherein a phase of said magnetic flux generated at at least one location of said plurality of first locations is different from a phase of said magnetic flux generated at at least another location of said plurality of first locations.

28. A method of sensing an occupant in a vehicle seat of a vehicle as recited in claim 21, wherein said least one second location comprises a plurality of second locations.

29. A method of sensing an occupant in a vehicle seat of a vehicle as recited in claim 28, wherein at least one of said plurality of second locations is proximate to an upper portion of a seat back of said vehicle seat and at least another of said plurality of second locations is proximate to a lower portion of said seat back of said vehicle seat.

30. A method of sensing an occupant in a vehicle seat of a vehicle as recited in claim 21, further comprising controlling the actuation of a safety restraint actuator so as to protect said occupant when the vehicle is involved in a crash, wherein the operation of controlling the actuation of a safety restraint actuator is responsive to said operation of discriminating.

* * * * *